CIRCUIT FOR CONTROLLING TRANSIENT VOLTAGES TO PREVENT PREMATURE TRIGGERING OF SEMICONDUCTORS

Filed Sept. 11, 1961

Inventor
John Baude
By Warren F.B. Lindsley
Attorney

United States Patent Office 3,214,677

Patented Oct. 26, 1965

3,214,677

CIRCUIT FOR CONTROLLING TRANSIENT VOLTAGES TO PREVENT PREMATURE TRIGGERING OF SEMICONDUCTORS

John Baude, Milwaukee, Wis., assignor to Allis-Chalmers Manufacturing Company, Milwaukee, Wis.

Filed Sept. 11, 1961, Ser. No. 137,244
7 Claims. (Cl. 323—22)

This invention relates to switching devices and more particularly to new and improved circuits for controlling transient voltages in relay control circuits and particularly control circuits employing semiconductor components. The transient voltages involved may originate within or outside of the control circuit.

Heretofore when transient voltages have been a problem the circuit has been rearranged, components were installed capable of withstanding the maximum voltage transient or an attempt was made to reduce or nullify the offending transient voltage at its source. These attempts were never fully satisfactory because at times it is difficult to rearrange the circuit or trace all forms of transient overvoltages to their source. When using semiconductors it is difficult to replace them with others when it may not be known exactly how high the offending transient voltage may be under all conditions. Thus, a need exists for protecting circuit components from transient overvoltages and from the problem of premature triggering of switching devices employing semiconductors due to the electric surges caused by the transient overvoltages.

In accordance with the invention claimed, a new and improved circuit for controlling electric current is provided. This circuit comprises a source of electric power, a load such as an inductive coil, and semiconductors which may be, for example, silicon controlled rectifiers having anode, cathode and gate electrodes connected in series with the load across the source. An electric circuit is connected across the semiconductors where voltage surges may be introduced. Impedance means are connected in series with the semiconductors and in parallel with the load for reducing the effect of the voltage surges to prevent premature triggering of the semiconductors. Signal means are connected to the semiconductors for triggering them into conduction causing current to flow through the semiconductors and the load.

It is, therefore, an object of this invention to provide a new and improved circuit for controlling the effect of transient voltages.

Another object of this invention is to provide a new and improved circuit employing semiconductors for controlling the effect of transient voltages in which the possibility of thermal runaway or undesirable surge triggering of the semiconductors is eliminated.

A further object of this invention is to provide a new and improved circuit employing a semiconductor switch for use in controlling the operation of a circuit breaker.

A still further object of this invention is to provide a new and improved circuit for controlling electric current in which a switching arrangement utilizes two semiconductors connected in tandem to control voltages in excess of the individual ratings of each of the semiconductors.

Figure 1:
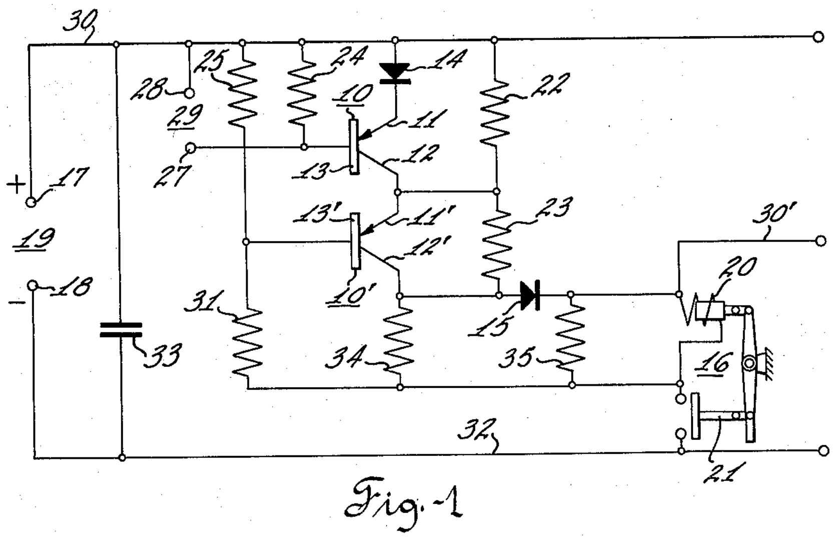
Figure 2:
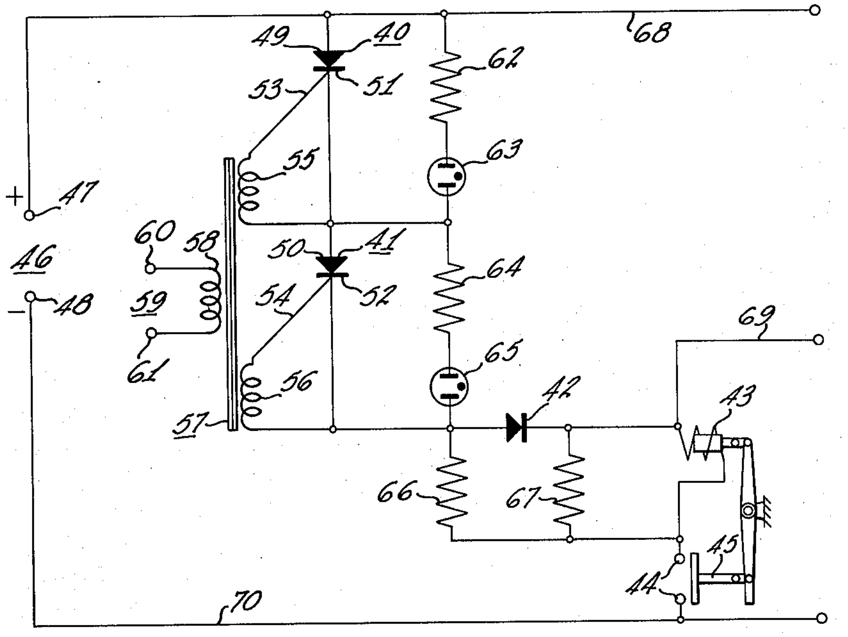

Objects and advantages other than those set forth will be apparent from the following description when read in connection with the accompanying drawing, in which:

FIG. 1 is a schematic drawing of a semiconductor switch employing a tandem connection of transistors and embodying the invention; and FIG. 2 is a modification of the structure illustrated in FIG. 1 and employing a tandem connection of silicon controlled rectifiers.

Referring more particularly to the drawing by characters of reference, FIG. 1 illustrates a pair of semiconductors such as junction transistors 10 and 10′ comprising emitters 11 and 11′, collectors 12 and 12′ and bases 13 and 13′. The emitters and collectors of transistors 10 and 10′ are connected in series arrangement with diodes 14 and 15 and a load 16 across terminals 17 and 18 of a source of electric power such as a direct current source 19. Load 16 may be of any suitable type but is shown herein as being a tripping coil 20 of a circuit breaker 21. Impedance means such as resistors 22, 23, 24, 25 and 31 are connected across transistors 10, 10′ in such a manner that each transistor gets its proper share of control voltage of source 19 both for operating and biasing purposes. Resistors 22 and 23 are connected across each of the transistors from their emitter to their collector electrodes. Resistors 24 and 25 are connected across the base electrodes and the emitter electrodes of transistor 10 and 10′ respectively, as shown in FIG. 1 with the emitter end of each shunting resistor being connected to the positive terminal 17 of source 19.

The base 13 of transistor 10 is connected to a terminal 27 for receiving negative pulses therefrom. The other terminal 28 of the signal source 29 is connected to the positive terminal 17 of source 19 through conductor 30. Base 13′ of transistor 10′ is connected through resistor 25 to conductor 30 and terminal 17 of source 19, and is also connected through resistor 31 and circuit breaker 21 to conductor 32 and to negative terminal 18 of source 19. Capacitor 33 is provided across source 19 adjacent terminals 17 and 18 for reducing the amplitude of very steep and short duration surges entering the system from source 19.

An electric conductor 30′ is connected to the disclosed circuit between coil 20 and diode 15 and forms with conductor 30 an electric circuit from which transient voltage pulses also may be introduced into the claimed circuit. Because of the inductive characteristics of the load 20 its impedance value in connection with surge voltages of very steep wave front becomes close to infinity. The surge voltages entering the circuit through conductors 30 and 30′, therefore, are applied to the semiconductors unattenuated.

According to the invention disclosed, resistors 34, 35 and diode 15 provide a parallel current path to the coil 20, said parallel current path having a definite impedance essentially independent from the surge voltage pulse. Resistors 34, 35 and diode 15 therefore tend to reduce the effect of surge impulses introduced into the claimed circuit and prevent arc unattenuated application of the voltage impulse surges to the semiconductors, thereby preventing premature triggering of transistors 10, 10′.

FIG. 2 illustrates the use of silicon controlled rectifiers instead of transistors in a circuit which functions similar to the one described in FIG. 1. A pair of silicon controlled rectifiers 40 and 41 are arranged in series circuit with a diode 42 and a closing coil 43 and contacts 44 of a circuit breaker 45 across a source of electric power such as, for example, the direct current source 46 through terminals 47 and 48. Rectifiers 40 and 41 comprise anode electrodes 49, 50, cathode electrodes 51, 52 and gate electrodes 53, 54, respectively. The gate electrodes 53 and 54 are connected in series circuit with secondary windings 55 and 56, respectively, of a transformer 57 having a primary winding 58 connected across a signal source 59 through terminals 60 and 61. Each of the secondary windings of transformer 57 are connected across the gate and cathode electrodes of the associated silicon controlled rectifiers. A resistor 62 and lamps 63 are connected in shunting arrangement across anode electrode 49 and cathode electrode 51 of rectifier 40, and a resistor 64 and lamp 65 are connected in shunting arrangement across anode electrode 50 and cathode electrode 52 of rectifier 41. Resistors 66 and 67 are connected on opposite sides of diode 42 and in shunt with coil 43 as shown. These resistors and diode 42 are used to bypass electrical surges from the conductor 68 connected to power supply 46 and a conductor 69 connected between coil 43 and diode 42 pass rectifiers 40 and 41. A ground conductor 70 connects the negative terminal 48 of the power supply to contacts 44.

When the circuit breaker 45 is closed contacts 44 are closed and tie resistors 66 and 67 directly to negative conductor 70 of the power supply 46. Surges which may be induced across rectifiers 40 and 41 from an electric source across conductors 68 and 69 are effectively grounded by resistors 66 and 67 and diode 42. These resistors may have a relatively low ohmic value such as, for example, 100 and 25 ohms, respectively.

In the "off" condition of the rectifiers the potential difference between the cathode and anode electrodes of each silicon controlled rectifier is equalized by resistor 62 and lamp 63 and by resistor 64 and lamp 65 which provide proper balance of the power supply voltage across each rectifier. The indicating lamps in series with resistors 62 and 64 provide for visual inspection of the potential across each rectifier.

If accidentally one of the rectifiers is triggered into conduction, the corresponding lamp will go out and indicate an improper state of the circuit.

Even though two silicon controlled rectifiers and lamps are shown they may be omitted and the circuit may operate with only one rectifier. Thus, a silicon controlled rectifier with sufficient high peak inverse voltage rating may be used to provide the desired interrupting action.

Although but two embodiments of the present invention have been illustrated and described it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A circuit for controlling electric current comprising a source of electric power, a load, a semiconductor having three electrodes, means for connecting two of said electrodes in series with said load across said source, an electric circuit connected across said two of said electrodes where surge impulses may be introduced, means connected in series with said two of said electrodes and in parallel with said load for reducing the effect of said surge impulses to prevent premature triggering of said semiconductor, and signal means connected to the third of said electrodes for triggering said semiconductor into conduction causing current to flow through said two electrodes and said load.

2. A circuit for controlling electric current comprising a source of electric power, a load, a semiconductor having emitter, collector and control electrodes, means for connecting said emitter and collector electrodes in series with said load across said source, an electric circuit connected across said emitter and collector electrodes where surge impluses may be introduced, means connected in series with said emitter and collector electrodes and in parallel with said load for reducing the effect of said surge impulses to prevent premature triggering of said semiconductor, and signal means connected to said control electrode for triggering said semiconductors into conduction causing current to flow through said emitter and collector electrodes and said load.

3. A circuit for controlling electric current comprising a source of electric power, a load, a silicon controlled rectifier having anode, cathode and gate electrodes, means for connecting said anode and cathode electrodes in series with said load across said source, an electric circuit connected across said anode and cathode electrodes where surge impulses may be introduced, means connected in series with said anode and cathode electrodes and in parallel with said load for reducing the effect of said surge impulses to prevent premature triggering of said semiconductor, and signal means connected to said gate electrode for triggering said rectifier into conduction causing current to flow through said anode and cathode electrodes and said load.

4. A circuit for controlling electric current comprising a source of electric power, a load, a silicon controlled rectifier having anode, cathode and gate electrodes, means for connecting said anode and cathode electrodes in series with said load across said source, an electric circuit connected across said anode and cathode electrodes where surge impulses may be introduced, resistance means connected in series with said anode and cathode electrodes and in parallel with said load for reducing the effect of said surge impulses to prevent premature triggering of said semiconductor, and signal means connected to said gate electrodes for triggering said rectifier into conduction causing a current to flow through said anode and cathode electrodes and said load.

5. A circuit for controlling electric current comprising a source of electric power, a load, a silicon controlled rectifier having anode, cathode and gate electrodes, means for connecting said anode and cathode electrodes in series with said load across said source, an electric circuit connected across said anode and cathode electrodes where surge impulses may be introduced, resistance means connected in series with said anode and cathode electrodes and in parallel with said load for reducing the effect of said surge impulses to prevent premature triggering of said semiconductor, a transformer having primary and secondary windings, said primary winding being connected to a signal means, said secondary winding being connected to said gate electrode for triggering said rectifier into conduction causing current to flow through said anode and cathode electrodes and said load.

6. A circuit for controlling electric current comprising a source of electric power, a load, a pair of silicon controlled rectifiers each having anode, cathode and gate electrodes, means for connecting said anode and cathode electrodes of each of said rectifiers in series with said load across said source, an electric circuit connected across said anode and cathode electrodes of said rectifiers where surge impulses may be introduced, impedance means connected in series with said semiconductor and in parallel with said load for reducing the effect of said surge impulses to prevent premature triggering of said semiconductor, a transformer comprising a primary winding and a pair of secondary windings, said primary winding being connected to a signal source, each of said secondary windings being connected to a different one of said gate electrodes for triggering said rectifiers into conduction causing current to flow through said anode and cathode electrodes of each of said rectifiers and said load.

7. A circuit for controlling electric current comprising a source of electric power, a load, a semiconductor having three electrodes, means for connecting two of said electrodes in series with said load across said source, an electric circuit connected across said two of said electrodes where surge impulses may be introduced, impedance means connected in series with said two of said electrodes and in parallel with said load for reducing the effect of said surge impulses to prevent premature triggering of said semiconductor, said impedance means comprising a pair of resistors connected in parallel across said load and interconnected at their ends adjacent said semiconductor by a diode, and signal means connected to the third of said electrodes for triggering said semiconductor into conduction causing current to flow through said two electrdodes and said load.

References Cited by the Examiner

UNITED STATES PATENTS

| | | | |
|---|---|---|---|
| 2,033,013 | 3/36 | Thompson | 323—8 X |
| 3,047,746 | 7/62 | Berkery | 317—20 |
| 3,049,632 | 8/62 | Staples | 307—88.5 |
| 3,058,034 | 10/62 | Sandin | 323—22 X |
| 3,058,036 | 10/62 | Reuther et al. | 323—22 X |
| 3,060,348 | 10/62 | Todd | 317—33 |
| 3,067,338 | 12/62 | Baude | 307—88.5 |
| 3,099,789 | 7/63 | Perrins | 317—20 |

FOREIGN PATENTS

| | | |
|---|---|---|
| 524,787 | 5/56 | Canada. |

LLOYD McCOLLUM, *Primary Examiner.*